Feb. 24, 1942.   M. P. TOZIER   2,274,440
PARKING BUMPER FOR MOTOR VEHICLES
Filed July 23, 1940   3 Sheets-Sheet 1
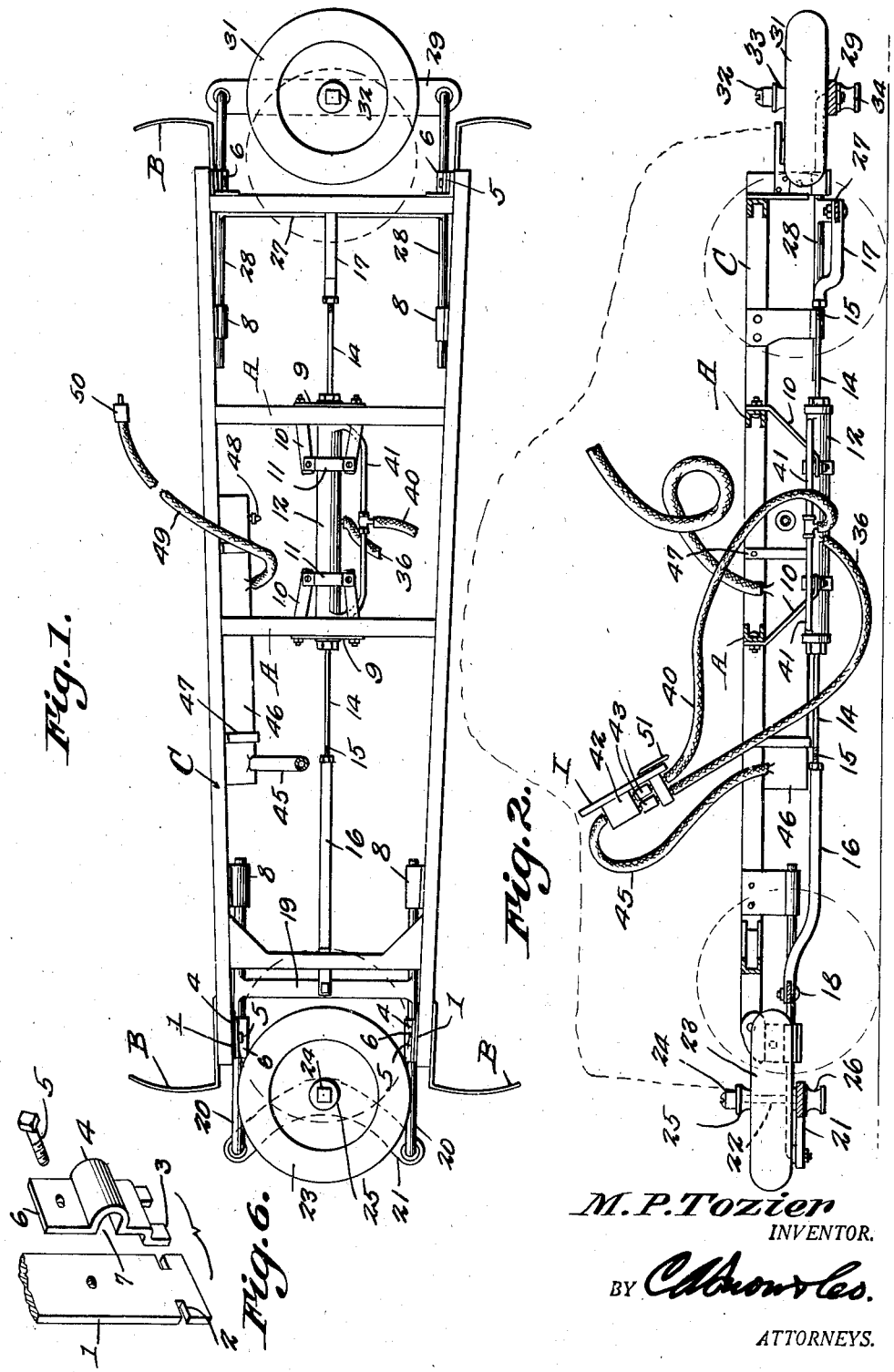
M. P. Tozier
INVENTOR.
BY
ATTORNEYS.

Feb. 24, 1942.   M. P. TOZIER   2,274,440
PARKING BUMPER FOR MOTOR VEHICLES
Filed July 23, 1940   3 Sheets-Sheet 2
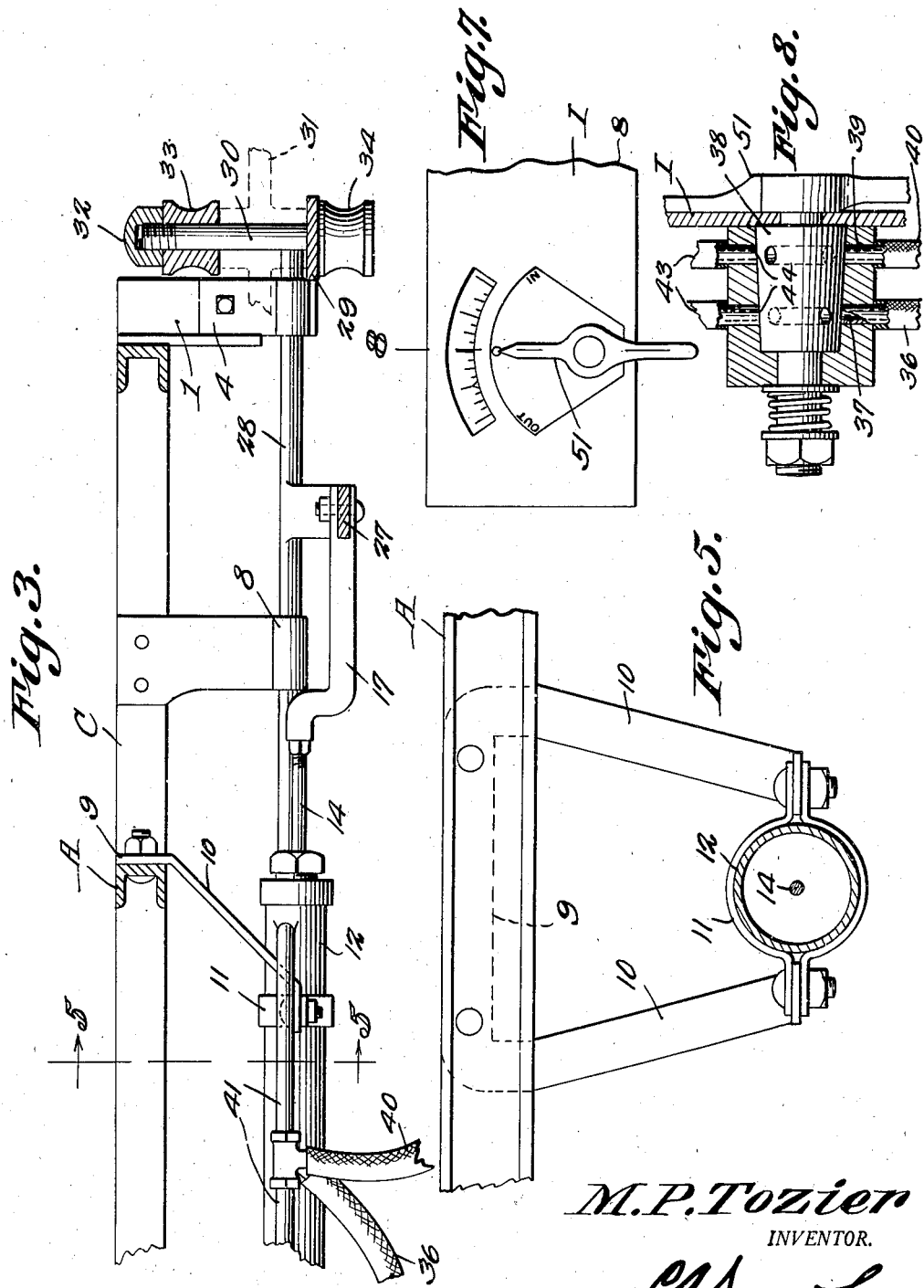
M. P. Tozier
INVENTOR.
BY C. A. Snow & Co.
ATTORNEYS.

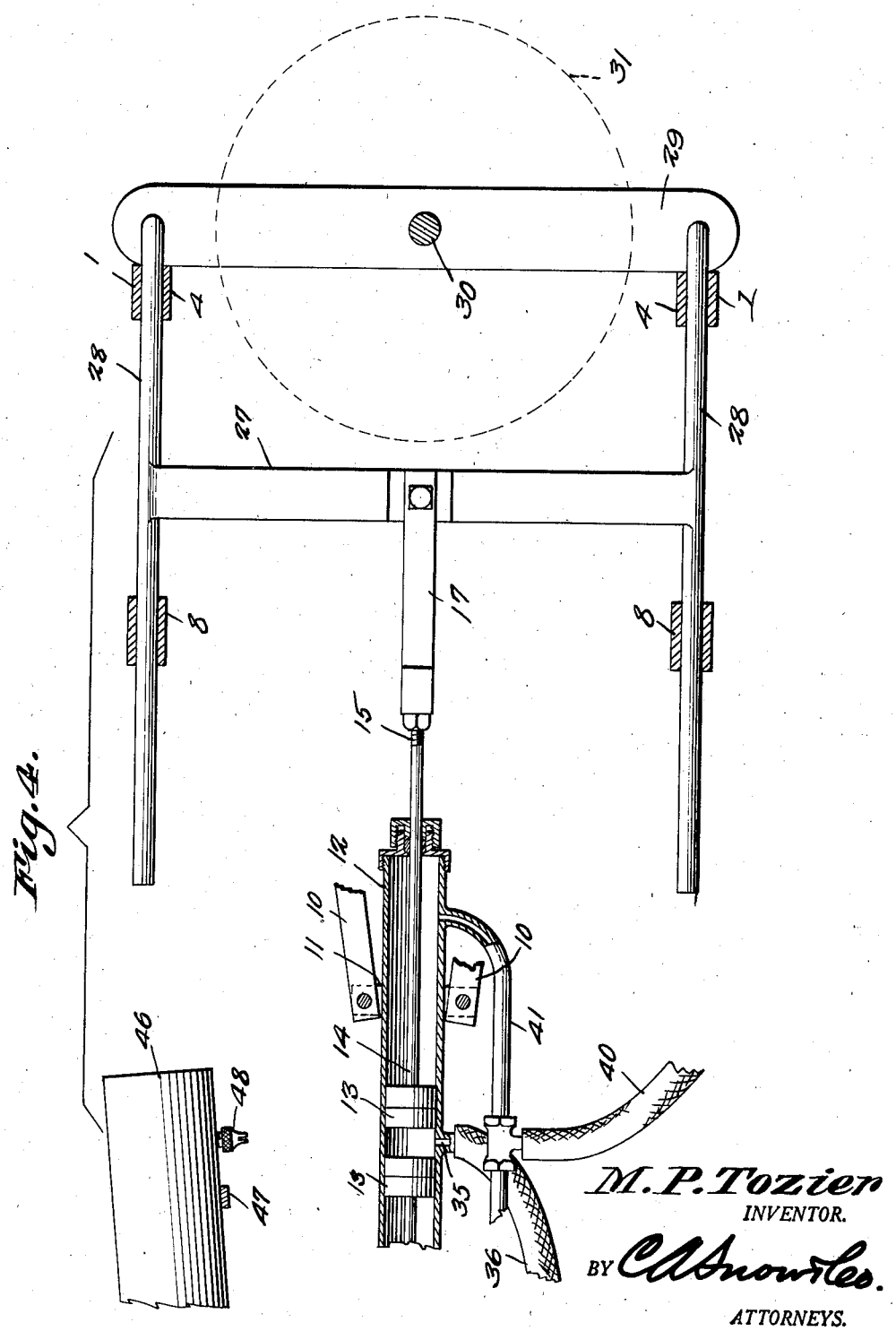

Patented Feb. 24, 1942

2,274,440

UNITED STATES PATENT OFFICE 2,274,440

PARKING BUMPER FOR MOTOR VEHICLES

Margaret Payne Tozier, Seattle, Wash.

Application July 23, 1940, Serial No. 347,009

3 Claims. (Cl. 293—55)

This invention relates to a parking bumper for automobiles, one of the objects being to provide bumpers controlled from the dashboard of the vehicle for maintaining predetermined distances between the vehicle when parked and the next adjoining vehicles, said bumpers being simultaneously retractable for the purpose of providing sufficient clearance to enable the parked car to be moved readily out of the parking space.

A further object is to provide bumpers of this type utilizing spare tires as impact-receiving elements, the tires, when not used as bumpers, being located beneath the chassis of the vehicle where they are inconspicuous.

Another object is to provide adjustable bumpers having means operated by air under pressure for shifting them into and out of active positions, the air being supplied from a tank or other container in which it is held under pressure and from which it can be withdrawn, if needed, for the purpose of inflating one or more of the vehicle tires.

Another object is to provide bumpers having means combined therewith whereby the vehicle can be towed readily.

A still further object is to provide a bumper the adjustable portion of which can be removed readily for the purpose of making repairs or replacements.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the accompanying drawings the preferred form of the invention has been shown.

In said drawings:

Figure 1 is a plan view of the chassis of a motor vehicle and showing the present improvements combined therewith, the impact-receiving elements being shown extended to their active positions and the controlling valve and gage being removed.

Figure 2 is a vertical longitudinal section through the apparatus and showing the gage and valve in elevation, the position of the car body being indicated by broken lines.

Figure 3 is an enlarged view partly in section and partly in elevation of one end portion of the bumper structure and the adjacent parts of the chassis.

Figure 4 is a horizontal section through the structure shown in Figure 3, said section being taken below the chassis and showing, in plan, a portion of the tank for holding compressed air.

Figure 5 is an enlarged section on line 5—5, Figure 3, parts being removed.

Figure 6 is a view showing in detail the parts of one of the guides of a bumper member, said parts being separated and one of them being broken away.

Figure 7 is a front elevation of the control valve.

Figure 8 is a section on line 8—8, Figure 7.

Referring to the figures by characters of reference, C designates the usual chassis of a motor vehicle and in the present case this is provided at the ends of its sides with resilient side bumpers B arranged in pairs, the bumpers of each pair being extended in opposite directions and said bumpers being attached to the chassis in any suitable manner. Secured to the inner surface of each side of the chassis adjacent to each end is a hanger 1 having opposed notches in its sides near its lower end, as shown at 2 in Figure 6 and these notches are adapted to receive spaced offset fingers 3 projecting from the lower end of a bearing plate 4 which is adapted to bear against one surface of the hanger 1 and to be held thereto by a removable bolt 5. Between its ends this plate 4 has an outstruck bead 6 defining a channel 7 adapted to be bridged by the hanger 1 and of such size as to provide a bearing as hereinafter explained.

Secured to the inner surfaces of the sides of the chassis C in alinement with the channels 7 are sleeves 8, one of these sleeves being alined with each of the bearing channels 7 as shown particularly in Figure 1.

The chassis C is provided with the usual intermediate cross-bars A and to these bars are secured the intermediate portions of yokes 9 the legs of which provide depending hangers 10 arranged in pairs, the hangers of the two pairs converging toward each other and bolted or otherwise attached at their lower ends to the terminals of split collars 11 which are secured tightly about a cylinder 12. Opposed pistons are mounted for reciprocation within this cylinder, as shown at 13, and each of these pistons has a rod 14 projecting through and outwardly beyond one of the closed ends of the cylinder 12. The free ends of the rod are preferably screwthreaded as shown at 15 for detachable and adjustable connection with arms 16 and 17 respectively extending toward the respective ends of the chassis. The arm 16 is secured at 18 to the middle portion of a cross-bar 19 which, in turn, is fixedly joined at its ends to parallel rods 20 slidably mounted within the bearing grooves or channels 7 at one end of the chassis and also slidably mounted within the adjacent sleeve 8. These rods 20 have their forward ends joined to an end bar 21 which, if located at the front end of the chassis, is preferably arcuate with its intermediate portion positioned back from the ends of the rods 20 as shown particularly in Figure 1. On the middle portion of this bar 21 is located a spindle 22 adapted to extend through the center of a spare wheel 23 which, in turn, is not only supported by the bar 21 but is held on the spindle by a removable nut 24. Between this nut and the wheel is located a rotatable spool 25. Another spool 26 is mounted on the bottom of the bar 21 at the center thereof. Either or both of these spools can be used when it is desired to tow the vehicle, it being possible readily to place a tow rope in engagement with either or both of them.

The upper arm 17 is joined to a cross-bar 27 which, in turn, is fixedly connected at its ends to parallel rods 28 slidably mounted within the rear sleeve 8 and bearing members 1 and 4 are provided therefor. An end bar 29 connects the outer ends of the rods 28 and has a spindle 30 extending upwardly therefrom corresponding with the spindle 22. This spindle is adapted to extend through the middle portion of a spare wheel 31 and has a removable retaining nut 32 which also serves to hold in position an upper spool 33 mounted on the wheel. A lower spool 34 is connected to and extends downwardly from the bar 29. These spools can also be used for towing purposes as will be apparent.

An air intake port 35 opens into the cylinder 12 between the pistons 13 and is connected by a flexible tube 36 to an outflow port 37 of a controlling valve 38 which can be mounted on the instrument board I of the vehicle. This valve is also provided with another outlet port 39 connected by a flexible tube 40 to a distributing pipe 41 opening at its ends into the end portions of the cylinder 12. If desired a pressure gage 42 can be mounted on the instrument board, this pressure gage having outlet tubes 43 leading therefrom to inlet ports 44 of valve 38 and there being another tube 45 leading to the pressure gage from an air storage tank 46. This tank can be secured by brackets 47 to one side of the chassis C. A valved inlet 48 is provided for the tank whereby air can be forced into the tank and retained under pressure by means of a suitable pump. The tank can also be provided with an outlet tube 49 having a check valve in its outer end. This tube can be of such length as to be used for the purpose of directing air under pressure from the tank to any one of the tires of the vehicle. When not in use it can be stored readily in the space below the vehicle body.

Valve 38 can be shifted by means of a hand lever 51 mounted on the instrument board and this is adapted to be used in connection with certain indications displayed on the board. For example when the lever is in an intermediate position it can point to "0" to indicate that it is in neutral position. When in one extreme position it can point to the word "Out" to indicate that the impact-receiving elements are in their projecting or advanced position. When the handle is moved to its other extreme position, it can point to the word "In" to indicate that the impact-receiving elements are retracted.

It is to be understood that air can be compressed in the tank 46 by any suitable means and it is intended to maintain air under pressure in this tank. When the handle or lever 51 is moved to its "in" position the valve will be turned so as to direct air from the tank 46, tube 45 and pressure indicator 42 through the valve to tube 40 which, in turn, distributes the air to the two ends of cylinder 12 so that the pistons are thus thrust toward each other and the two bumper elements are retracted with the wheels 23 and 31 pulled back into position between the ends of the sides of the chassis. When thus located the projecting portions of the wheels will cooperate with the resilient bumpers B to afford ample protection for the vehicle during ordinary driving.

When it is desired to park the car, the same is moved into the parking space in the usual way and thereafter the valve is shifted so as to direct air under pressure into tube 36. Thus pistons 13 will be forced apart and the two pairs of rods 20 and 28 will be shifted away from each other with the result that the wheels 23 and 31 will also be pushed outwardly beyond the ends of the chassis as shown in Figure 1. Thus it becomes impossible, while the wheels are located in their outwardly extended positions, for any other vehicles to so crowd the parked car as to interfere with its movement from the space in which it is parked.

When it is desired to leave the parking space the valve is shifted to direct air under pressure into the two ends of the cylinder 12. This results in the retraction of the bumper units and leaves ample space at the front and back of the vehicle to allow the car to be moved away from its position.

By providing bearings such as shown in Figure 6, it is possible simply by removing the bolts 5, to remove plate 4 and thus withdraw the bumper unit from the chassis after the arms 16 and 17 have been disconnected from the rods 14. This enables the user to make repairs or replacements readily.

The entire apparatus can be installed easily in a vehicle and, as will be noted, merely occupies space which otherwise would be unused.

By providing the spools 25, 26, 33 and 34 above and below the spare wheels 23 and 31, they not only can be used to make towing convenient but they are also positioned where they can absorb shocks from other cars whose bumpers are lower than those of the car equipped with the present improvement.

What is claimed is:

1. The combination with the chassis of a motor vehicle, of a parking bumper including a structure slidably mounted within each end portion of the chassis, a spare wheel mounted on each of said structures for movement therewith and constituting an impact-receiving element, a cylinder between and alined with the centers of the spare wheels, opposed pistons in the cylinder and connected to the respective structures, and means under the control of the occupant of the vehicle for directing fluid under pressure into the cylinder and between the pistons to simultaneously move the structures away from or toward each other.

2. The combination with the chassis of a motor vehicle, of a parking bumper including a structure slidably mounted within each end portion of the chassis, a spare wheel mounted on each of said structures for movement therewith and constituting an impact-receiving element, a cylinder between and alined with the centers of the spare wheels, opposed pistons in the cylinder and connected to the respective structures, under the control of the occupant of the vehicle for directing fluid under pressure from the tank into the cylinder and between the pistons to move the structures apart simultaneously and for directing said fluid from the tank and into the end portions of the cylinders to shift the pistons toward each other and retract the wheel-carrying structures.

3. The combination with a vehicle body, of a structure slidably connected to and normally supported beneath each end portion of the body, a spare wheel removably mounted on each structure and held against upward removal therefrom by the overlying portion of the body, a cylinder interposed between said structures, opposed pistons therein rigidly connected to the respective structures, and valve controlled means operable from within the body for simultaneously actuating the pistons to shift the structures and the wheels thereon beyond the body and release the wheels for removal from the structures, and for moving the structures toward each other to retract them and their wheels beneath the body.

MARGARET PAYNE TOZIER.